(No Model.)
N. A. BOIES.
SAFETY DEVICE FOR HORSES.
No. 261,990. Patented Aug. 1, 1882.
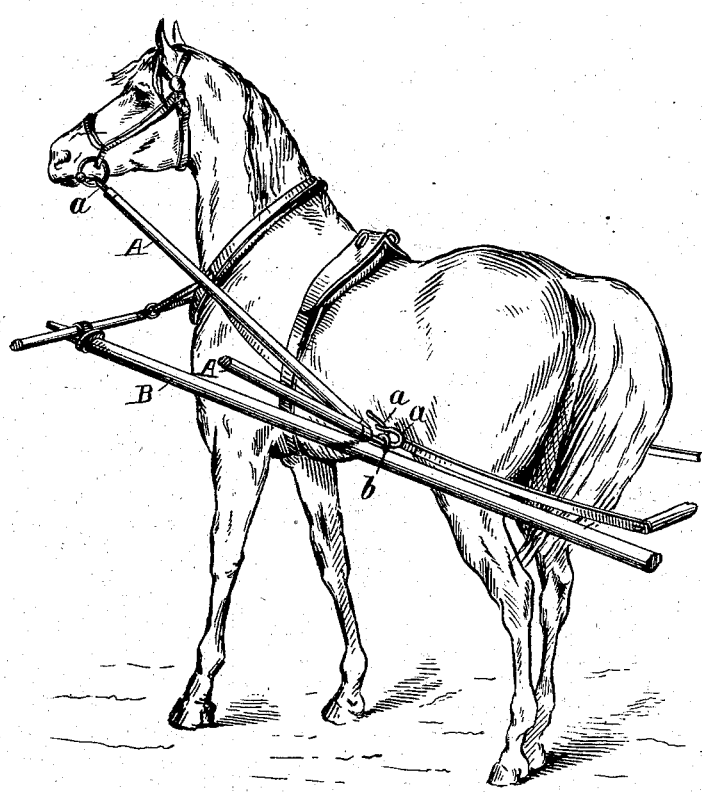
WITNESSES:
INVENTOR:
N. A. Boies
BY
ATTORNEYS.

UNITED STATES PATENT OFFICE.

NOBLE A. BOIES, OF EAST PALESTINE, OHIO.

SAFETY DEVICE FOR HORSES.

SPECIFICATION forming part of Letters Patent No. 261,990, dated August 1, 1882.

Application filed May 25, 1882. (No model.)

*To all whom it may concern:*

Be it known that I, NOBLE A. BOIES, of East Palestine, in the county of Columbiana and State of Ohio, have invented a new and Improved Safety Device for Horses, of which the following is a full, clear, and exact description.

My invention is intended to be used with kicking horses and horses having other vicious habits, with the object to allow them to be successfully worked; and it consists of a safety-bar which is attached to the bridle of the horse and to the pole or shaft, as hereinafter described and claimed.

Reference is to be had to the accompanying drawing, wherein my safety device is shown as applied to one horse of a team.

The device may be used with one horse or two.

It consists of a rigid bar, A, of suitable material, provided with rings or hooks $a\ a$ at its ends.

When used with two horses, as shown, one end of the bar A is attached to the ring on the end of the bit, and the other end of the bar is hooked to an eye, $b$, that is attached upon the pole B at a suitable distance back from the forward end. A similar bar is used in connection with each horse, and the bars serve to keep the horses in their proper places.

For a single horse two of the bars A will be used, one at each side, attached to the bit and to the holdbacks on the shafts. This allows the horse to go forward without hindrance, but prevents him from backing.

With this device applied the horse is prevented from backing. He cannot run away, cannot kick when properly reined up, and cannot nip or bite other horses; and in this manner horses having these and other vicious habits can be worked without trouble.

Having thus described my invention, I claim as new and desire to secure by Letters Patent—

The combination, with ordinary harness, of the rigid bar A, attached at its forward end to the bit-ring and at its rear end to the pole or shaft, substantially as shown and described.

NOBLE A. BOIES.

Witnesses:
C. P. ROTHWELL,
JOSEPH BRITTAIN.